United States Patent
Costa Requena et al.

(10) Patent No.: US 7,729,355 B2
(45) Date of Patent: Jun. 1, 2010

(54) HANDLING A REQUEST TO ESTABLISH A PACKET SWITCHED SESSION

(75) Inventors: Jose Costa Requena, Helsinki (FI); Inmaculada Espigares Del Pozo, Helsinki (FI); Matti Turunen, Tampere (FI)

(73) Assignee: Nokia Corporation, Espoo (FI)

( * ) Notice: Subject to any disclaimer, the term of this patent is extended or adjusted under 35 U.S.C. 154(b) by 2157 days.

(21) Appl. No.: 10/410,500

(22) Filed: Apr. 7, 2003

(65) Prior Publication Data
US 2003/0223426 A1 Dec. 4, 2003

(30) Foreign Application Priority Data
Apr. 16, 2002 (WO) .................... PCT/IB02/01348

(51) Int. Cl.
  H04J 3/24 (2006.01)
  H04L 12/66 (2006.01)
  H04W 4/00 (2009.01)
  G06F 15/16 (2006.01)

(52) U.S. Cl. .................. 370/395; 370/338; 370/349; 370/352; 455/437; 709/227

(58) Field of Classification Search ......... 370/230–310, 370/328–356, 401–466, 392–395; 455/412–558, 455/402–406; 709/225–245, 204–206
See application file for complete search history.

(56) References Cited

U.S. PATENT DOCUMENTS 6,438,114 B1 * 8/2002 Womack et al. ............. 370/329
6,917,611 B2 * 7/2005 Dorenbosch et al. ........ 370/352
6,928,150 B2 * 8/2005 Johnston ................. 379/114.01
6,958,994 B2 * 10/2005 Zhakov et al. ............. 370/352
7,016,343 B1 * 3/2006 Mermel et al. ............. 370/356
7,079,521 B2 * 7/2006 Holur et al. ................ 370/338
7,126,939 B2 * 10/2006 Barany et al. .............. 370/352

(Continued)

FOREIGN PATENT DOCUMENTS

WO    WO 00/78080 A1 * 12/2000

OTHER PUBLICATIONS

N. Parameshwar et al, "Advanced SIP Series: SIP and 3GPP Operations" Award Solutions, Mar. 3, 2002, XP-002226653 pp. 1-10.

(Continued)

*Primary Examiner*—M. Phan

(57) ABSTRACT

The invention relates to a method for handling a request by a first communication device 11 connected to a network of a communication system to establish a packet switched session with a second, wireless communication device 12, which session requires the second communication device 12 to be connected to a network which enables the establishment of the session. In order to enable an enhanced handling of such a request, it is proposed that it is first determined whether the second communication device 12 is currently connected to such a network. In case it is determined that the second device 12 is not connected to such a network, a corresponding indication is transmitted to the first device 11. The user of the first device 11 is then informed via the first device 11 that the requested session cannot be established. The invention relates equally to a communication system enabling such a method and to corresponding elements 11, 13 of such a system.

33 Claims, 3 Drawing Sheets

U.S. PATENT DOCUMENTS

| | | | |
|---|---|---|---|
| 7,158,627 B1* | 1/2007 | Lu | 379/221.07 |
| 7,200,139 B1* | 4/2007 | Chu et al. | 370/352 |
| 7,227,865 B2* | 6/2007 | Shaheen et al. | 370/395.21 |
| 7,339,908 B2* | 3/2008 | Uhlik et al. | 370/331 |
| 7,483,989 B2* | 1/2009 | Williams et al. | 709/227 |
| 7,574,212 B2* | 8/2009 | McConnell et al. | 455/437 |
| 2001/0049790 A1* | 12/2001 | Faccin et al. | 713/185 |
| 2002/0110104 A1* | 8/2002 | Surdila et al. | 370/338 |
| 2002/0131575 A1* | 9/2002 | Gallant | 379/220.01 |
| 2002/0176404 A1* | 11/2002 | Girard | 370/352 |
| 2002/0176405 A1* | 11/2002 | Aijala | 370/352 |
| 2002/0191597 A1* | 12/2002 | Lundstrom | 370/356 |
| 2003/0002457 A1* | 1/2003 | Womack et al. | 370/329 |
| 2003/0023730 A1* | 1/2003 | Wengrovitz et al. | 709/227 |
| 2003/0027569 A1* | 2/2003 | Ejzak | 455/432 |
| 2003/0043740 A1* | 3/2003 | March et al. | 370/229 |
| 2004/0015589 A1* | 1/2004 | Isozu | 709/227 |
| 2004/0028009 A1* | 2/2004 | Dorenbosch et al. | 370/329 |
| 2004/0127209 A1* | 7/2004 | Riikonen et al. | 455/422.1 |
| 2004/0252674 A1* | 12/2004 | Soininen et al. | 370/352 |
| 2005/0154793 A1* | 7/2005 | Khartabil | 709/227 |
| 2006/0286984 A1* | 12/2006 | Bonner | 455/445 |
| 2007/0014281 A1* | 1/2007 | Kant | 370/352 |
| 2007/0053343 A1* | 3/2007 | Suotula et al. | 370/352 |
| 2007/0165599 A1* | 7/2007 | Skog et al. | 370/352 |
| 2007/0248079 A1* | 10/2007 | Jayaram et al. | 370/352 |
| 2008/0288643 A1* | 11/2008 | Suotula et al. | 709/227 |
| 2008/0316998 A1* | 12/2008 | Procopio et al. | 370/352 |

OTHER PUBLICATIONS

N. Parameshwar et al, "Advanced SIP Series: SIP and 3GPP" Award Solutions, Inc., Mar. 3, 2002, XP-002226654, pp. 1-9.

J. Rosenberg et al, "SIP: Session Initation Protocol" draft-ietf-sip-rfc2543bis-09.txt, Feb. 27, 2002, XP002226651.

3GPP: "3rd Generation Partnership Project; Technical Specification Group Core Network; Signalling flows for the IP multimedia call control based on SIP and SDP; Stage 3 (Release 5)" 3GPP TS 24.228 V5.0.0, Mar. 19, 2002, XP002226652.

* cited by examiner

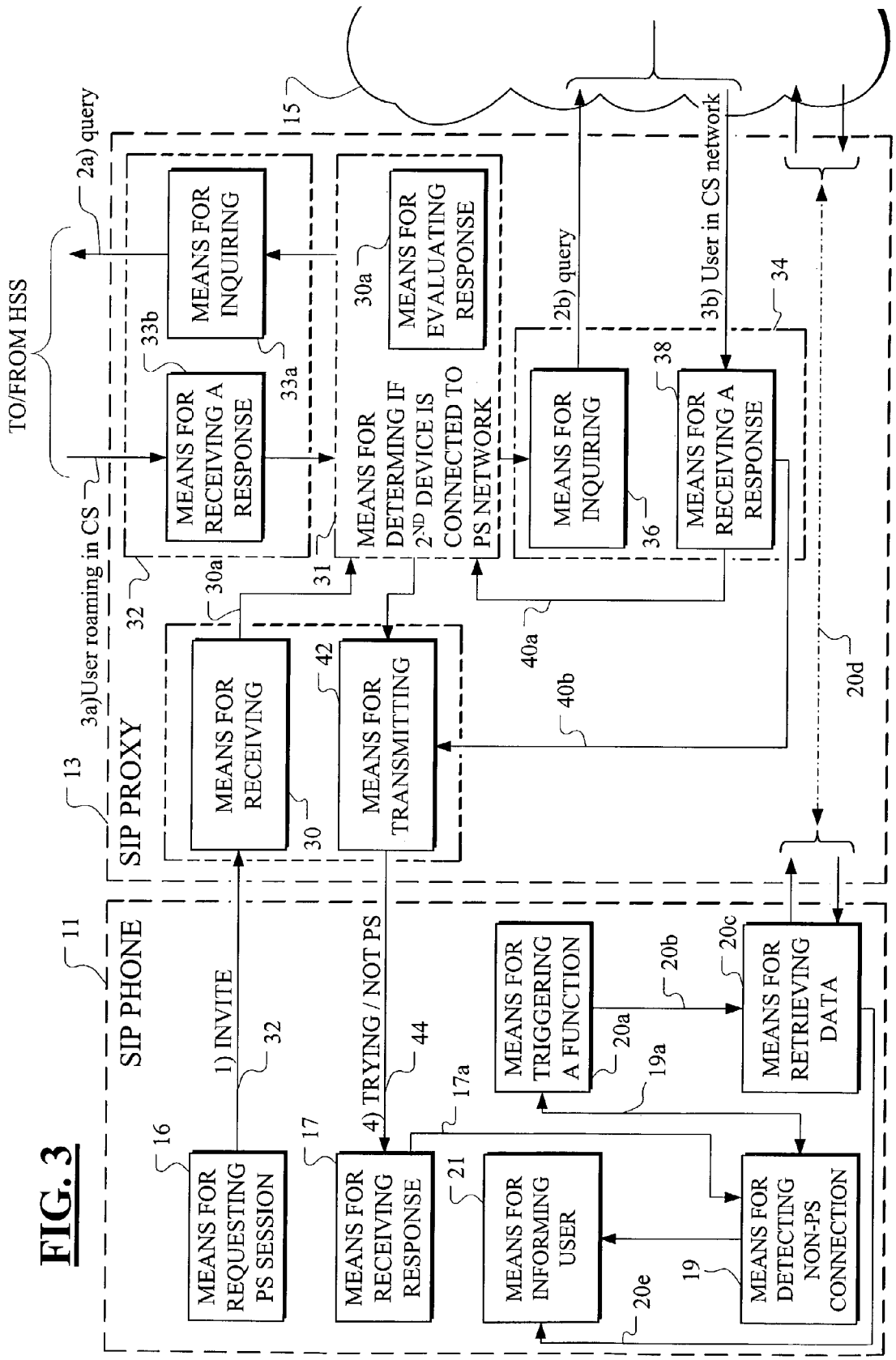

HANDLING A REQUEST TO ESTABLISH A PACKET SWITCHED SESSION

CROSS-REFERENCE TO RELATED APPLICATION

This application claims priority under 35 USC 119 to International Application PCT/IB02/01348, filed Apr. 16, 2002.

FIELD OF THE INVENTION

The invention relates to a method for handling a request by a first communication device connected to a network of a communication system to establish a packet switched session with a second, wireless communication device, which session requires the second communication device to be connected to a network of the communication system, which network enables the establishment of the requested session. The invention relates equally to a network element, to a communication device and to a communication system comprising at least one network element and one communication device.

BACKGROUND OF THE INVENTION 3G (3rd generation) communication systems will enable new kinds of calls with new features by providing packet switched (PS) connections via PS networks. Such calls can be in particular calls in the course of which multimedia content is transmitted, e.g. video calls, gaming sessions, etc.

According to 3GPP (3rd generation partnership project), which offers specifications for 3G systems, a Session Initiation Protocol (SIP) is to be employed for call control and signaling functions when Internet Protocol (IP) technology is to be used end-to-end for delivering multimedia content to mobile terminals.

SIP is an IETF (Internet Engineering Task Force) protocol which is defined e.g. in the Request for Comments (rfc) 2543bis-09: "SIP: Session Initiation Protocol", of Sep. 4, 2000, which is incorporated by reference herein.

SIP constitutes an application-layer control protocol that can establish, modify and terminate multimedia sessions or calls between two or more parties in an IP network. To this end, a variety of SIP messages are defined. A SIP message can be either a request from a client to a server, or a response from a server to a client. SIP allows for instance to determine the willingness of a called party to engage in a requested communication and to set up a call by establishing call parameters at both, called and calling party.

However, also conventional circuit switched systems will further exist within the 3G communication systems. The 3G specific features relying on a PS connection can obviously not be used with communication devices connected to a circuit switched (CS) network of the communication system.

A communication device may be connected to a circuit switched network of a 3G communication system, because it is a CS device which is only capable of accessing circuit switched networks. But also PS devices may roam from a PS network to a CS network, e.g. from UMTS (universal mobile telecommunication services) to GSM (global system for mobile communications), in particular as long as the PS networks do not cover all areas.

A calling party may therefore unintentionally try to establish a 3G specific session with a called party which is at least currently connected to a CS network. The calling party is not able to know to which kind of network a called PS device is currently connected, and sometimes, a calling party may not be aware that the called party is using a CS device.

When a session requiring a PS connection is requested to be establish with such a device connected to a CS network, an establishment of the connection will be tried, but fail and be dropped. This implies a waste of resources of the connecting networks and of the device connected to a CS network. Further, the user of the requesting terminal is not aware of the reason for which the requested session is not established.

SUMMARY OF THE INVENTION

It is an object of the invention to enhance the handling of a request by a first communication device connected to a network of a communication system to establish a packet switched session with a second, wireless communication device, which session requires the second communication device to be connected to a network of the communication system which enables the establishment of the requested session.

This object is reached according to the invention with a method comprising as a first step determining whether the second communication device is currently connected to a network enabling the establishment of the requested session. In case the second communication device is at least currently not connected to a network enabling the establishment of the requested session, a corresponding indication is transmitting to the first communication device in a second step. In a last step, a user of the first communication device is informed via the first communication device that the requested session cannot be established.

The object of the invention is equally reached with a network element for a network of a communication system, which comprises means for receiving from a first communication device a request to establish a packet switched session with a second, wireless communication device, which session requires said second communication device to be connected to a network of the communication system which enables the establishment of the requested session. The proposed network element further comprises means for determining whether the second communication device is currently connected to a network enabling the establishment of the requested session. Moreover, the network element of the invention comprises means for transmitting an indication to the requesting first communication device that the second communication device is currently not connected to a network enabling the establishment of the requested session, if this was determined.

The object of the invention is also reached with a communication system comprising at least such a network element of a communication network and at least one communication device. The communication device of the proposed communication system can access the communication network. It moreover includes means for requesting the establishment of a packet switched session with another, wireless communication device, which session requires that the other communication device is connected to a network of the communication system which enables the establishment of the requested session. The communication device further comprises means for receiving a response indicating that the other communication device is currently not connected to a network enabling the establishment of the requested session. The communication device includes in addition means for informing a user that the requested session cannot be established.

The object of the invention is finally reached with a communication device which is able to access a network of a communication system. The communication device according to the invention comprises means for requesting the establishment of a packet switched session with another, wireless communication device, which session requires that the other communication device is connected to a network of the communication system which enables the establishment of the requested session. The device further comprises means for receiving a response to a request for a session with another communication device, which response indicates that the other communication device is currently not connected to a network enabling the establishment of the requested session. In addition, the communication device according to the invention comprises means for detecting in a received response to a request for a session with another communication device an indication that the other communication device is currently not connected to a network enabling the establishment of the requested session and for triggering a function associated in the communication device to the detected indication. The triggered function can consist in any desirable reaction to the indication that a requested session cannot be established, including a notification to the user of the communication device.

The invention proceeds from the idea that a user initiating a PS session via a communication device could be informed in case the session cannot be established, whenever the called party is roaming in networks which do not enable the establishment of the requested session. The reason for this might be that the communication device of the called party does not support packet switched sessions at all or only in a limited way, and is thus not able to roam in the kind of networks required for the requested session. Further, a communication device which principally supports the establishment of the requested session might currently be connected to a network, like a CS network, which does not enable the establishment of the requested PS session. In order to enable the notification to the calling party, it is therefore determined in the network to which kind of network the communication device of the called party is currently connected.

It is an advantage of the invention that it is more convenient to the calling party, since the calling party is informed about the impossibility of establishing the desired session. It is further an advantage of the invention that it is simple and easy to develop. Further, it allows to save resources of the called communication device and of the network, since the establishment of the session can be interrupted at an early point of time, i.e. before it fails.

In an advantageous embodiment of the invention, the information that the requested session cannot be established is presented to a user on a display of the first communication device.

The information can be presented for example as an icon, an alert and/or an advertisement. The data required for the presentation does not have to be stored necessarily in the first communication device itself. Preferably, the information to the first communication device indicating that the second communication device is currently not connected to a network enabling the establishment of the requested session rather comprises an identification of a location from which data for presenting the information that the requested session cannot be established can be downloaded. This data may belong in particular to an icon or an applet. It can be stored for instance at some server which the communication device is able to access via the network to which it is connected.

In addition to the actual information that a requested session cannot be established, the user may be provided with different options for a further proceeding. These options may be presented as well on the display of the communication device. The offered options can include for example canceling the request and/or establishing a voice connection instead of the requested connection before the network drops the initiated session.

The information to the first communication device indicating that the second communication device is currently not connected to a network enabling the establishment of the requested session is preferably provided by a network element of the network to which the first communication device is connected.

The information may be included for example in a header of a response message transmitted to the first communication device.

In a further preferred embodiment of the invention, the establishment of the session is based on the SIP using SIP messages. In this case, existing mechanisms can be made use of and it is not necessary to add new features to existing protocols.

The request to establish a session can be included in particular in a SIP INVITE message. The INVITE message indicates according to the above cited rfc 2543bis-09 that a user or a service is being invited to participate in a session. The message body of an INVITE message may further contain a description of the session to which the called party is being invited.

The information to the first communication device indicating that the second communication device is currently not connected to a network enabling the establishment of the requested session may be included in particular in a SIP Informational response message. Such a SIP Informational response message indicates according to the above cited rfc 2543bis-09 that a contacted server or proxy is performing some further action and does not yet have a definitive response. The employed SIP Informational response message can be for instance a SIP 100 TRYING response message to the first communication device. A 100 Trying response message indicates according to the above cited rfc 2543bis-09 that some unspecified action is being taken on behalf of a call, but the called party has not yet been located.

The information to the first communication device indicating that the second communication device is currently not connected to a network enabling the establishment of the requested session is further preferably included in a header of a SIP response message, e.g. of the SIP 100 TRYING response message.

For SIP messages, several obligatory and optional headers are defined in the above cited rfc 2543bis-09. It is proposed that for the purposes of the invention, a CALL-INFO header and/or a WARNING header of a SIP response message is employed.

The CALL-INFO general header field can be used according to the above cited rfc 2543bis-09 for providing additional information about the caller or the called party, depending on whether it is found in a request or response. A CALL-INFO header may contain in particular an URI (uniform resource indicator) to supplementary call information on a server. The purpose of the respective URI is described by a "purpose" parameter in the header. The "purpose" parameter "info" describes the caller or called party in general. The CALL-INFO header thus provides a flexible possibility to provide a communication device with information.

For the invention, a URI inserted into a CALL-INFO header may point to a location from which data for an icon or an applet can be downloaded, which icon or applet are to be used for informing the user of a device that a called party is not connected to a network enabling the establishment of the requested session. When a communication device receives such a CALL-INFO header, it is then able to retrieve the data for supplementary information from the server using an additional suitable protocol, e.g. HTTP (hypertext transport protocol), which is an IETF standard for distributed, collaborative, hypermedia information systems.

The CALL-INFO header may provide moreover some additional content at the application level.

The WARNING header defined in the above cited rfc 2543bis-09 can be employed in addition, in case a header is desired which enables a triggering of more extensive functions.

The WARNING header field is intended to carry additional information about the status of a response. WARNING headers are sent with responses and contain a three digit warning code, a host name, and a warning text. In case the first digit of the warning code is a "3", the WARNING header comprises a warning specific to SIP. Warning codes 300 through 329 are reserved for indicating problems with keywords in the session description, warning codes 330 through 339 are reserved for warnings related to basic network services requested in the session description, warning codes 370 through 379 are reserved for warnings related to quantitative QoS parameters requested in the session description, and warning codes 390 through 399 are reserved for miscellaneous warnings that do not fall into one of the above categories. Additional warning codes can be defined according to the above cited rfc 2543bis-09 through IANA (Internet Assigned Numbers Authority), thus also a new warning-code for indicating that a called user is roaming in a CS network. The warning text in the WARNING header should be in a natural language that is most likely to be intelligible to the human user receiving the response.

The information included in the WARNING header may trigger certain functions in the receiving communication device, which will depend on the application that is currently running. Thus, some intelligence is added to the communication devices. The WARNING header is used by the communication device without notification to the user. It might be useful to trigger some additional functionality based on the code indicated in the header. The warning is interpreted as part of certain exceptional happenings in the type of session that is to be established. The warning code may for example inform an application that the called communication device is currently under CS domains using GSM, in which packet switched multimedia services are not supported. Thus, in case the application is trying to send Rich Call information such as Clips, attachments etc. as part of the session set up, it will be aware due to the information in the WARNING header that the other communication device will not be able to handle Rich Call information. The application will thus refrain from sending Rich Clip information, since this would result either in a call attempt failure or the content will dropped at some point by the network. Similarly, the warning code may inform an application that the called communication device is roaming in a kind of GPRS network which supports PS connections, but which might not have SIP capabilities or which might not support packet switched multimedia services. Also in this case, the application will know that specific added value transmitted in the call set-up will be lost.

In case the information to a user indicating that a requested session cannot be established is included in an optional header, like the SIP CALL-INFO header and the WARNING header, interoperability problems are avoided. Any communication device that is not capable of interpreting the header can simply ignore it. Thus, only communication devices that are able to understand the feature will provide a service facilitating the announcement that a called party is not connected to a network enabling the establishment of the requested session.

In the first communication device, advantageously a user agent (UA) takes care of presenting the information that the device of a called party is not connected to a network enabling the establishment of the requested session. A user agent is an application which can act both as a user agent client and user agent server. The user agent can also access a data source, for example an indicated HTTP server, to retrieve data required for presenting the information.

A network element taking care of informing the communication device that a requested session cannot be established may not know itself whether or not the communication device of the called party is not connected to a network enabling the establishment of the requested session. Therefore, such a network element preferably comprises means for inquiring from a further network element of the communication system to which kind of network the other communication device is currently connected. The first network element comprises in this case moreover means for receiving a response to the query, and means for evaluating the response to the query. The further network element can be for example a network element of a public switched telephone network (PSTN), while the first network element may be a network element of a UMTS network. The invention can thus relate also to UMTS-PSTN interworking.

BRIEF DESCRIPTION OF THE FIGURES

Other objects and features of the present invention will become apparent from the following description of an exemplary embodiment of the invention considered in conjunction with the accompanying drawings, of which

FIG. 3 shows a network element such as the SIP proxy of FIG. 1, which may be used to carry out the methodology, according to the present invention.

DETAILED DESCRIPTION OF THE INVENTION

Figure 1:
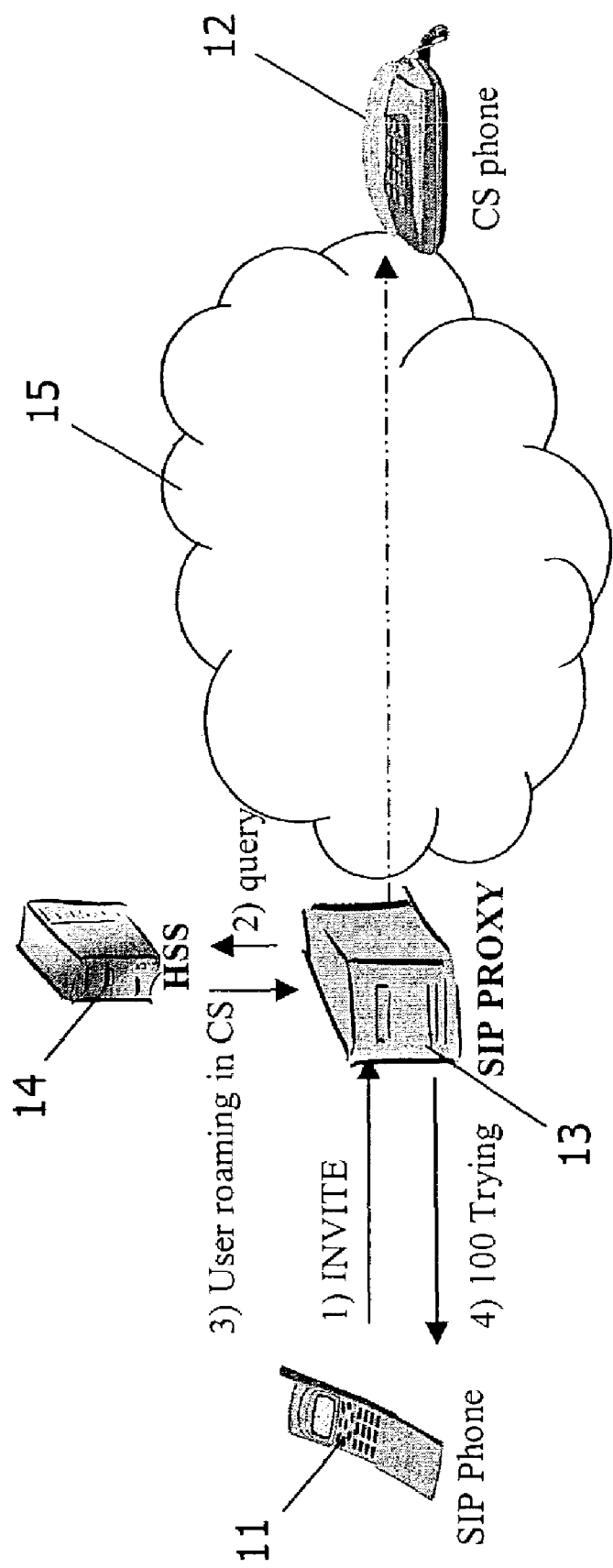
FIG. 1 illustrates an embodiment of the method according to the invention implemented in a communication system according to the invention.

FIG. 1 presents selected elements of a communication system in which the present invention can be realized.

The communication system comprises a first phone 11 used by a first user and a second phone 12 used by a second user. The first phone 11 is a SIP phone which is currently connected to a PS network, e.g. a UMTS network, while the second phone 12 is a fixed CS phone connected to a CS network, i.e. PSTN. The second phone 12 could also be a SIP phone which is only currently connected to a CS network, e.g. a mobile SIP phone currently roaming in a GSM network or another kind of CS mobile phone such as a GSM phone.

The PS network comprises a SIP proxy 13 and a Home Subscriber Server (HSS) 14 which is accessible by the SIP proxy 13. A HSS is a server in a 3G network which stores information for the terminals, such as security credentials, service profiles and routing area information used for locating a terminal. The HSS 14 thus comprises information on the current location of all phones 11, 12 of the communication system. The SIP phone 11 is able to communicate with the CS phone 12 via the SIP proxy 13 and connecting networks 15 in voice sessions, indicated in the figure with an arrow with a dashed line, but not in sessions requiring a PS connection, like gaming etc.

The first user assumes erroneously that the phone 12 employed by the second user is also a SIP phone roaming in PS networks and desires to establish a session which requires a PS connection with the user of the CS phone 12.

The first user therefore initiates the desired session by transmitting a SIP INVITE message including the phone number of the second user via the SIP phone 11. The transmission of the INVITE message is indicated in FIG. 1 as a first step 1). Alternatively, the first user might transmit a SIP URL including the phone number of the second user phone 11, e.g. "sip:+358401234568@sonera.fi", for initiating the desired session.

The SIP Proxy 13 receives this request from the SIP phone 11. Thereupon, the SIP proxy 13 transmits a query to the HSS 14 inquiring about the current location of the phone 12 identified in the INVITE message by a phone number of its user. The transmission of the query to the HSS 14 is indicated in FIG. 1 as a second step 2).

The HSS 14 determines based on the received information the current location of phone 12. In a third indicated step 3), the HSS 14 informs the SIP proxy 13 that the second user is roaming at least currently in a CS network.

As a result, the SIP proxy 13 assembles a 100 TRYING informational SIP response and sends it to the SIP phone 11 of the first user, before trying to establish the session with the CS phone 12 via the connecting networks 15. The transmission of the 100 TRYING is indicated in FIG. 1 as a fourth step 4).

The transmitted 100 TRYING contains a CALL-INFO header and a WARNING header. The CALL-INFO header has for example the format "<http://www.nokia.com/cs.app>; purpose=info". The first part of the CALL-INFO header constitutes a URI to an icon or an applet on a specific HTTP server. The "purpose" parameter "info" describes the called party in general. The WARNING header has for example the format "3XX nokia.com 'CS roaming'", wherein "3XX" stands for a three digit number warning code that was defined through the IANA specifically for indicating that a called user is roaming in a CS network.

"nokia.com" stands for the host name, and "'CS roaming'" is the required warning text of the WARNING header.

The SIP phone 11 receives the 100 TRYING and the associated CALL-INFO header and WARNING header.

A user agent of the SIP phone 11 knows from the information in the CALL-INFO header that the phone 12 of the called party is at least currently connected to a CS network and retrieves the icon or applet of which a source is identified by the URI in the CALL-INFO header from the corresponding HTTP server. The HTTP server is not shown in FIG. 2. Further, the SIP phone 11 displays the fetched icon on its display or runs the fetched applet.

The icon or the applet presents an information to the user of the SIP phone 11 indicating that the called phone 12 is at least currently connected to a CS network. Thus, the first user is informed that the second user is at least currently not capable of participating in more than a voice session.

The SIP phone 11 further presents on its display options enabling a user to cancel the requested session or to establish e.g. a voice session instead of the requested session. In case the first user was interested only in a session requiring a PS connection, he/she may now select the first option and cancel the session, in order to avoid wasting resources in the network. In case the first user desires to establish a voice session instead of the originally requested session, he/she can select the second option and keep on the phone 11 to establish a 'normal' voice call with the second user via the CS phone 12.

The information in the CALL-INFO header can be used by the SIP phone 11 in addition for some functionality at the application layer, in order to provide the user with further information.

The WARNING header in the 100 TRYING message provides additional information to the SIP phone 11 indicating that a session different from the requested session is being established. The WARNING header may be used by the phone 11 exclusively for terminal functionality. An intelligent terminal can use the warning code "3XX" included in the WARNING header to trigger certain functions without notifying the user.

Figure 2:
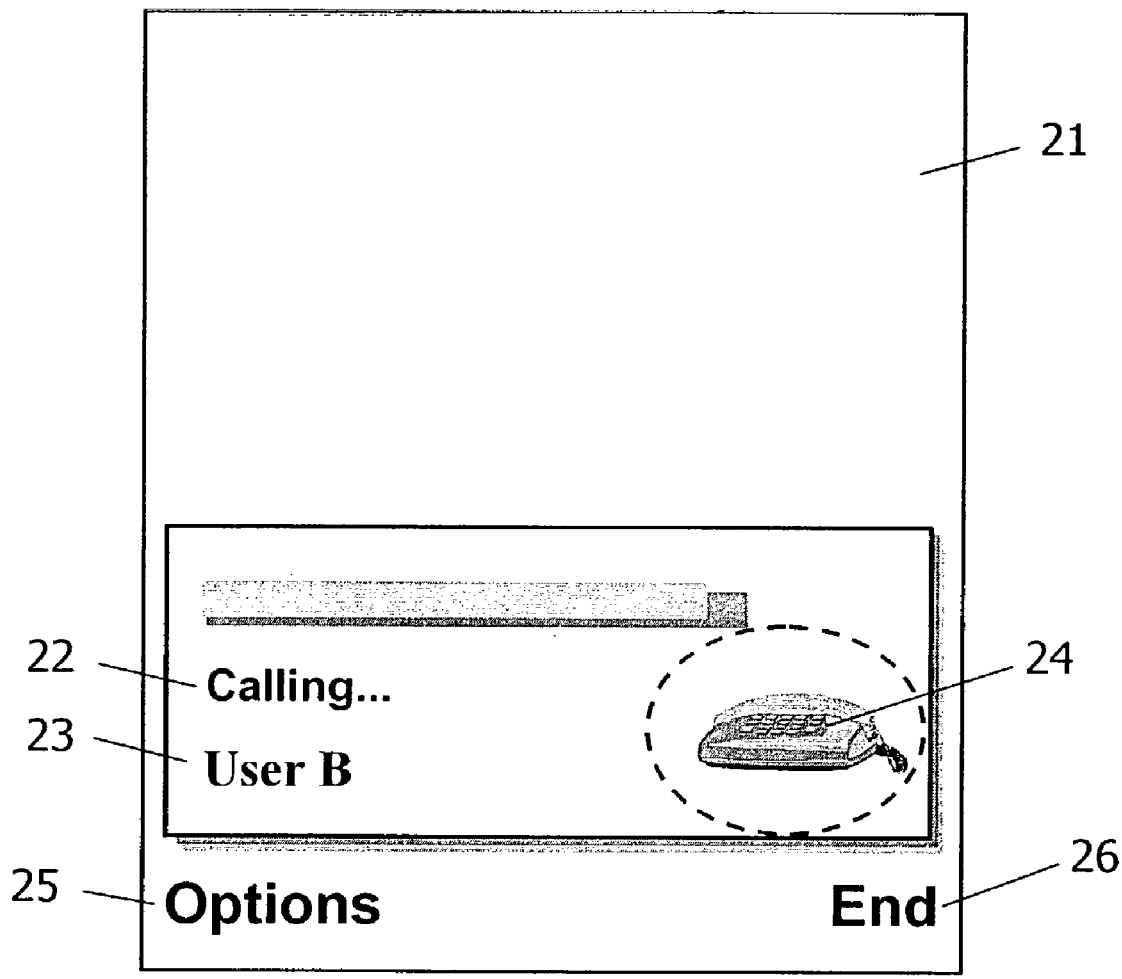
FIG. 2 shows an exemplary presentation of information according to the invention on a display of a mobile phone.

FIG. 2 shows an exemplary presentation on the display 21 of the SIP phone 11 of FIG. 1 after the 100 TRYING message was received.

The display 21 informs the user that a session is tried to be established by an indication "Calling . . . " 22 and to which called party by an indication "User B" 23. Further, an icon 24 representing a CS phone, which is circled in the figure by a dashed line, informs the user of the SIP phone that the called party "User B" uses a CS phone or is at least currently connected to a CS network. The data for this icon was retrieved by the mobile phone as described above from a server. It should be understood that this particular icon constitutes only an example.

Moreover, any other kind of alert could be used to inform the user of the SIP phone that the called party is at least currently connected to a CS network, e.g. a plain text or a JAVA applet etc. The display 21 further offers the user to view possible options for proceeding with the call by selecting a presentation "Options" 25 or to end the call by selecting a presentation "End" 26. When selecting the presentation "Options" 25, one option might be presented for example for establishing a normal voice call instead of the requested session. The display 21 may show in addition other elements which are not depicted in FIG. 2.

FIG. 3 shows a network element such as the SIP proxy 13 of FIG. 1 which may be used to carry out the methodology described above. The network element 13 of FIG. 3 includes means 30 for receiving from a first communication device 11 a request signal on a line 32 to establish a packet switched session with a second, wireless communication device 12, which session requires the second communication device to be connected to a network of the communication system shown in FIG. 1, which network enables the establishment of the requested session. The means 30 of FIG. 3 may provide a received signal on a line 30a means 31 for determining whether the second communication device 12 is currently connected to a network enabling the establishment of the requested session. Although the means for receiving and the means for determining are shown as separate functional blocks in FIG. 3, they could be implemented in a single device or process. It should also be realized that if implemented as separate elements they may be coupled together either directly or through intervening devices. The means 31 for determining if the second device is connected to a network enabling the establishment of the requested session may be used to determine if the second device is connected to a packet switched network. It can do this either by contacting the HSS 14 of FIG. 1 as shown by signal lines 2a and 3a in FIG. 3 or by inquiring from yet a further network element of the communication system to which kind of network the second communication device is currently connected. FIG. 3 shows the internals of such a device 32 for making inquiry 2a by a means 32 for making inquiry and means 33b for receiving a response. Another device 34 has a similar structure with devices 36, 38. In other words, the means 34 has means 36 for inquiring from the further network element the type of network the second communication device is attached to. It also has means 38 for receiving a response 3b therefrom and for providing an indication thereof on a signal line 40a to the means 31 for determining if the second device is connected to a PS network or 40*b* to a means 42 for transmitting directly an indication to the first device that the second device is not in the packet switched network by a signal on a line 44.

Another signal on the line 44 may also be used earlier in the scenario to indicate to the first communication device that the proxy 13 is "trying" to establish a connection. If the identification of the second communication device is not found in the HSS 14 of FIG. 1, then the device 34 of FIG. 3 may be used to make a similar inquiry to some intermediate network element connected between the proxy 13 of FIG. 1 and the second communication unit 12 and residing within the network 15.

FIG. 3 also shows functional details of the SIP phone 11 in FIG. 1 in more detail. It includes means 16 for requesting a packet switched (PS) session and providing the INVITE signal on the line 32 to the SIP proxy 13. It also includes means 17 for receiving the signal on the line 44 from the SIP proxy 13 indicating that the proxy is "trying" or has made a determination that the second device 12 is not connected to a PS network. The means 17 for receiving this response provides an output signal on a line 17*a* to a means 19 for detecting a nonpacket switched connection in the second device. In turn, the means 19 provides a signal to means 21 for informing the user about this fact. This may be done by way of the display of FIG. 2. On the other hand, instead of directly signaling the means 21, the means 19 for detecting the non-PS connection may instead send a signal on a line 19*a* to a means 20*a* for triggering a function. This could be a variety of functions including those mentioned above. One of these functions is for example to retrieve data from outside the SIP phone 11 through some other network. Therefore, the means for triggering the function 20*a* sends a signal on a line 20*b* to a means 20*c* for retrieving data. The retrieval of such data is shown by a signal on a line 20*d* that is routed through the SIP proxy 13 to the network 15. Once the retrieved data is received back at the means 20*c*, it provides the data on a line 20*e* to the means 21 for informing the user. This could be information retrieved from a URL or execution of an applet obtained by this methodology.

It is to be noted that the described embodiment constitutes only one of a variety of possible embodiments of the invention. Thus, although the invention has been shown and described with respect to a best mode embodiment thereof, it should be understood by those skilled in the art that the foregoing and various other changes, omissions and additions in the form and detail thereof may be made therein without departing from the spirit and scope of the invention.

The invention claimed is:

1. Method for handling a request by a first communication device connected to a network of a communication system to establish a packet switched session with a second communication device, which is a wireless communication device, said method comprising:
   determining whether said second communication device is currently connected to a network enabling the communication system to establish the packet switched session;
   in case it is determined that said second communication device is at least currently not connected to a network enabling the communication system to establish the packet switched session, transmitting a corresponding indication to said first communication device.

2. Method according to claim 1, wherein said corresponding indication transmitted to said first communication device that said second communication device is currently not connected to a network enabling the communication system to establish the packet switched session comprises an identification of a location from which data for informing a user that said session cannot be established can be downloaded by said first communication device.

3. Method according to claim 1, wherein said corresponding indication transmitted to said first communication device that said second communication device is currently not connected to a network enabling the communication system to establish the packet switched session is included in a header of a response message to said request.

4. Method according to claim 1, wherein said request and said indication transmitted to said first communication device that said second communication device is currently not connected to a network enabling the communication system to establish the packet switched session comply with the Session Initiation Protocol.

5. Method according to claim 4, wherein said request is a Session Initiation Protocol INVITE message or a Session Initiation Protocol URL and that said indication transmitted to said first communication device that said second communication device is currently not connected to a network enabling the communication system to establish the packet switched session is included in a header of a Session Initiation Protocol response message.

6. Method according to claim 5, wherein said corresponding indication transmitted to said first communication device that said second communication device is currently not connected to a network enabling the communication system to establish the packet switched session is included in a Session Initiation Protocol 100 TRYING response message to said first communication device.

7. Method according to claim 6, wherein said corresponding indication transmitted to said first communication device that said second communication device is currently not connected to a network enabling the communication system to establish the packet switched session is included in a CALL-INFO header and/or a WARNING header of a Session Initiation Protocol message to said first communication device.

8. Apparatus configured to
   receive from a first communication device a request to establish a packet switched session with a second communication device a communication system,
   determine whether said second communication device is currently connected to a network of said communication system enabling establishment of said packet switched session; and
   transmit an indication to said first communication device that said second communication device is currently not connected to said network enabling establishment of said packet switched session, in case said second communication device is currently not connected to said network enabling establishment of said packet switched session.

9. Apparatus according to claim 8, further configured
   to transmit a query to a further network of said communication system about the kind of network to which said second communication device is currently connected,
   to receive a response to said query, and
   to evaluate said response to said query.

10. Apparatus according to claim 8, configured to transmit an indication which comprises an identification of a location from which data for informing a user that said packet switched session cannot be established can be downloaded by said first communication device, in case said second communication device is currently not connected to said network enabling establishment of said packet switched session.

11. Apparatus according to claim 8, configured to insert said indication into a header of a response message to said request by said first communication device.

12. Apparatus according to claim 8, configured to
receive said request complying with a Session Initiation Protocol, and configured
transmit an indication complying with said Session Initiation Protocol, in case said second communication device is currently not connected to said network enabling establishment of said packet switched session.

13. Apparatus according to claim 12, configured to insert said indication into a header of a Session Initiation Protocol response message to said request comprising a Session Initiation Protocol INVITE message received by said apparatus.

14. Apparatus according to claim 13, configured to insert said indication into a Session Initiation Protocol 100 TRYING response message to said first communication device.

15. Apparatus according to claim 14, configured to insert said indication into a CALL-INFO header and/or a WARNING header of a Session Initiation Protocol message to said first communication device.

16. Apparatus configured to
request the establishment of a packet switched session with a wireless communication device via a network of a communication system;
receive a response to said request for said packet switched session with said wireless communication device, which response indicates that the wireless communication device is currently not connected to said network enabling the establishment of said packet switched session; and
detect in said response to said packet switched session with said wireless communication device an indication that the wireless communication device is currently not connected to said network enabling the establishment of said packet switched session for triggering a function associated in said apparatus to said indication.

17. Apparatus according to claim 16, further configured to inform a user of said apparatus that a packet switched session cannot be established.

18. Apparatus according to claim 16, further configured to retrieve data from a location indicated in said response, and use said data for indicating to a user of said apparatus that the packet switched session cannot be established.

19. Apparatus according to claim 17, further comprising a display, wherein said apparatus is configured to present a corresponding information on said display.

20. Apparatus according to claim 17, configured to inform a user with an icon, an alert and/or an advertisement that said packet switched session cannot be established.

21. Apparatus according to claim 17, configured to run an applet for informing a user that said packet switched session cannot be established.

22. Apparatus according to claim 17, configured to present a selectable option to a user to establish a voice call instead of said packet switched session and/or a selectable option to cancel said packet switched session.

23. Apparatus according to claim 16, configured to handle Session Initiation Protocol messages.

24. Apparatus according to claim 8, wherein said apparatus is a network element of said communication system.

25. Apparatus according to claim 16, wherein said apparatus is a communication device connectable to said network of said communication system.

26. Method comprising:
requesting establishment of a packet switched session with a wireless communication device,
receiving a response to the request for establishment of said packet switched session with said wireless communication device, the response comprising an indication that the wireless communication device is currently not connected to a network of a communication system enabled to establish said packet switched session; and
detecting in said response said indication that the wireless communication device is currently not connected to said network of a communication system enabled to establish said packet switched session for triggering a function associated in said apparatus to said indication.

27. Method according to claim 26, wherein a user is informed that a requested session cannot be established.

28. Method according to claim 27, wherein a user is informed that said packet switched session cannot be established by a presentation on a display of said first communication device.

29. Method according to claim 27, wherein a user is informed by an icon, an alert and/or an advertisement that said packet switched session cannot be established.

30. Method according to claim 27, wherein a user is informed by an applet that said packet switched session cannot be established.

31. Method according to claim 27, wherein in addition to informing a user that said packet switched session cannot be established, a selectable option is presented to said user to establish a voice call instead of said packet switched session and/or a selectable option to cancel the request.

32. Apparatus comprising:
means for receiving from a first communication device a request to establish a packet switched session with a second communication device;
means for determining whether said second communication device is currently not connected to a network enabling establishment of said packet switched session; and
means for transmitting an indication to said first communication device that said second communication device is currently not connected to said network enabling the establishment of said packet switched session, in case said second communication device is currently not connected to said network enabling the establishment of said packet switched session.

33. Apparatus comprising:
means for sending a request for establishment of a packet switched session with a wireless communication device via a network of a communication system, wherein said packet switched session requires that said wireless communication device is connected to a network of a communication system that enables the establishment of said packet switched session;
means for receiving a response to said request for establishment of said packet switched session with said wireless communication device, wherein said response indicates that the wireless communication device is currently not connected to said network that enables the establishment of said packet switched session; and
means for detecting in said response an indication that the wireless communication device is currently not connected to said network that enables the establishment of said packet switched session and for triggering a function associated in said apparatus to said indication.

* * * * *